April 4, 1967 O. DUROUCHOUX 3,312,125
DEVICE FOR STORING KINETIC ENERGY, USABLE AS A TORSIONAL
VIBRATION DAMPER AND COUPLER
Filed May 11, 1965
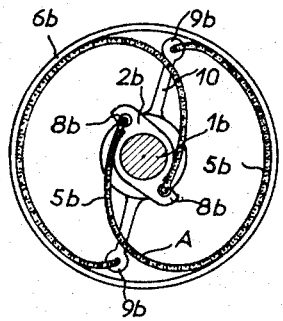
Fig.: 2
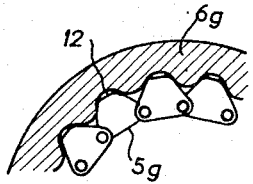
Fig.: 7
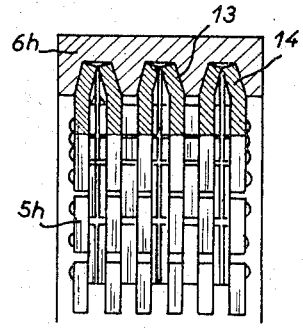
Fig.: 8
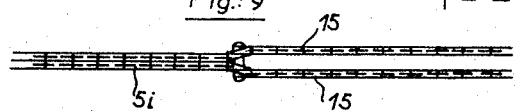
Fig.: 9
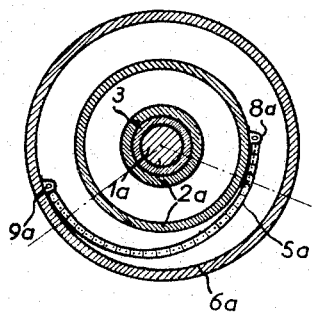
Fig.: 1
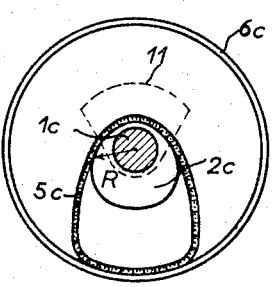
Fig.: 3
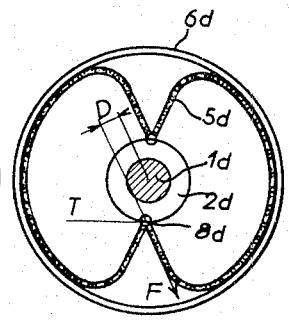
Fig.: 4
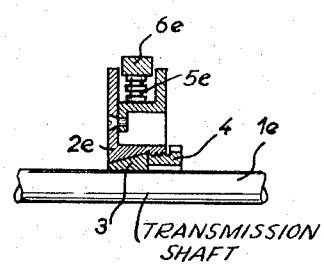
Fig.: 5
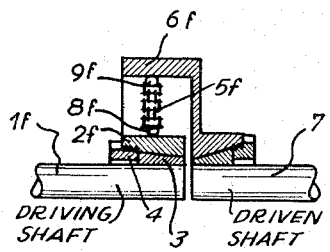
Fig.: 6
INVENTOR
Olivier Durouchoux
By
Watson, Cole, Grindle & Watson
ATTORNEYS United States Patent Office 3,312,125
Patented Apr. 4, 1967

3,312,125
DEVICE FOR STORING KINETIC ENERGY, USABLE AS A TORSIONAL VIBRATION DAMPER AND COUPLER
Olivier Durouchoux, 94 Rue du Bac, Paris, France
Filed May 11, 1965, Ser. No. 454,938
Claims priority, application France, May 11, 1964, 974,059
12 Claims. (Cl. 74—572)

In my Patent No. 3,208,303 were described kinetic energy storing devices the essential part of which was a flexible though not necessarily elastic, weightly elongated element, which stored the kinetic energy by coiling itself up into a plurality of turns which it formed between a central hub and a housing surrounding the same, said turns leaving a certain radial clearance once they had been coiled up. Said element had one end integral with said hub and its other end fast with the housing, preferably by simple friction. In all cases, the kinetic energy possessed by such an element was greatly in excess of the energy required to bend it. Coupling means are provided for rigidly uniting at will the hub and the casing with a driving shaft and a driven shaft respectively, the ratio of the relative speeds of which may differ widely from unity.

Among possible embodiments of the flexible but weighty elongated element were cited a preferably metallic strip or wire, though it will be manifest that said element could alternatively consist of a chain of any known type or of any suitable assembly of wires, notable examples being a woven, knitted or braided strip. These latter-mentioned forms of embodiment are characterised by their relatively great mass per unit length, which in turn led to envisaging functions other than that of a flywheel for the subject device of the invention.

The present invention relates to devices in which a flexible but weighty elongated element serves to interconnect a hub and a casing having equal mean rotation speeds in this case, and permits of achieving a timewise distribution of the energy fluctuations resulting from irregularities in one of said rotation speeds.

In a first form of embodiment, the casing and the flexible element act as a torsional vibration damper for a shaft with which said hub is permanently rigid and which is surrounded by said casing.

In a second constructional form, the hub and casing are permanently rigidly connected to a driving shaft and a driven shaft respectively, the device fulfilling the function of a coupling virtually devoid of internal friction losses, and said weighty and flexible element transmitting torque from the driving shaft to the driven shaft.

The two ends of said element can be rigidly connected to the hub and the casing respectively by any convenient positive securing means whereby to be capable of rotating the casing even when the device deviates from its normal operating conditions. Alternatively, however, the inner end of the weighty flexible element may be rendered fast with the casing by the frictional forces resulting from inertia, thereby allowing the second constructional form of the device to operate subsidiarily as a torque limiter.

In contrast to the device described in the applicant's prior patent cited in the premable, in which the flexible element adapted to be transferred from the hub to the periphery of the casing, and vice versa, is preferably thin and produces a large number of turns, the two forms of embodiment according to the present invention utilize chains which are thick enough to be relatively weighty but which produce a very small number of turns. The result of these differences in constructional form is that the active mass of the element actually transferred from the hub to the casing and vice versa, and the mechanical energy involved in this transfer as well as the variation in the moment of inertia, are much greater in the case of the device termed a "flywheel" than in the case of a vibration damper or a coupler. In the former case, the element shifts from the casing to the hub (or vice versa) and coils up (or uncoils) in continuous manner, whereas in the latter case the element oscillates about a mean position.

The description which follows with reference to the accompanying non-limitative exemplary drawings will give a clear understanding of the invention and of the manner of carrying it into practice.

In the drawings:

FIGURES 1 through 4 are end views of various possible forms of embodiment of a device according to the invention.

FIGURES 5 and 6 are corresponding diametrical sectional views showing a torsion damper and a coupler respectively.

FIGURE 7 is an end view on an enlarged scale of a constructional detail of the casing and the flexible element that increases the mutual friction therebetween.

FIGURE 8 shows in radial section an alternative constructional form for obtaining the same result.

FIGURE 9 shows on a reduced scale a developed flexible element.

In what follows, like parts bear like reference numerals on all the figures, generally followed by a different letter for each form of embodiment.

FIGURE 1 shows a first constructional form of the invention, in which a shaft 1a is made rigid with a hub 2a, for instance by means of a taper sleeve 3 thrust axially by a nut 4 (see FIGURES 5 and 6). To the hub 2a are pivotally connected as at 8a a plurality of chains 5a, for example by means of ball-joints or rubber blocks acting as pseudo-ball-joints. These chains have their other ends 9a likewise pivotally connected to a casing 6a substantially coaxial with the hub 2a.

The shaft 1a may be a driving shaft connected for instance to a motor. The hub 2a will then be the driving member and the casing 6a the driven member, the transmission therebetween being ensured by the chains 5a. In such a case, with the illustrated arrangement, rotation will take place in the counter-clockwise direction. Alternatively, casing 6a could be the driving member and hub 2a and shaft 1a the driven members, in which case rotation will take place in the clockwise direction.

In the midway operative condition, each chain 5a may comprise a portion tangential to the hub 2a (or to the casing 6a, respectively) adjacent one of its ends 8a, 9a, at least. The minimum practical length of the portion comprised by all the links stretched between the hub and the casing (which portion may be termed the "free length" since it is not in contact with the hub or the casing) is equal to half the length of the segment intercepted by the casing on a tangent to the hub. The steady-state shape of a chain which is tangential at one of its ends at least depends in practice on the torque transmitted or on the rotation speed, these two quantities being interdependent. While it is conceivable that a chain forming part of a vibration damper or a coupler may form more than one turn, the active portion of the chain (which is longer than the free length and is formed by all those chain links which are at least temporarily and consecutively stretched between the hub and the casing in the course of the more or less oscillatory operating mode of the device) is much shorter than the chain itself, in contrast to what happens in the case of the flywheel described in the above-cited patent, in which the active portion of the strip corresponds to a large number of winding turns.

In FIGURE 5, the casing 6e is free but has its movement limited axially by two assembled flanges formed on the hub 2e, and radially by its abutment against one or the other of the chains 5e. In this embodiment, shaft 1e is a transmission shaft connected at one end to a driving means and at the other end to a driven means. In FIGURE 6, the casing 6f is rigidly connected to a driven shaft 7 which is at least substantially coaxial with the driving shaft 1f. The ball-joints 8f, 9f will absorb certain alignment flaws in the two shafts 1f and 7. Obviously, an alternative arrangement would be to replace the casing 6e of FIGURE 5 by a casing similar to the casing 6f of FIGURE 6 but which is positively centered on the shaft 1e by any convenient means (other than the securing means 3, 4) for allowing it to rotate.

FIGURE 2 shows an alternative constructional form in which the chains 5b are again pivotally connected at 8b to the driving hub 2b and consequently positively connected to said hub by their inner ends. Since their outer ends are firmly applied against the inner periphery of the driven casing 6b by inertia, the ensuing friction will allow the chains to carry the casing along with them in their motion. The length of each chain 5b in this specific embodiment is substantially equal to half the inner perimeter of the casing. In order to perfect the symmetry of the device, the free outer ends 9b of the chains 5b may be interconnected by a beam lever 10 fulcrumed coaxially with the shaft 1b, about which it is freely rotatable. In cases where three chains 5b are used, the beam-lever 10 may be replaced by a triangular member bearing three hinge points spaced at intervals of 120°, and so on.

It would also be possible to eliminate the beam-lever 10 by securing the outer end 9b of each chain 5b to a point such as the point A of an adjacent chain (see FIGURE 2).

It goes without saying that such a device may be combined with a variety of conventional elastic systems without departing from the spirit and scope of the invention. By way of example, an elastic element such as a coil spring could be connected in series with a chain 5, in which case such an elastic element would be positioned intermediate the hub 2 and the shaft 1. Said elastic element could alternatively be positioned in parallel with a chain 5, in which case it would be rigidly connected to the hub 2 and would coil itself around the latter like the chain 5. It would even be possible to thread the elastic element between the links of the chain.

It would furthermore be possible to multiply the flexible elements by arranging a plurality of hubs and casings in parallel or in series, as was illustrated in the previously cited patent. In the latter case, an intermediate sleeve could be positioned between a coaxial hub and casing, two flexible elements being used to separate the hub and the casing, respectively, from said sleeve, which would thus fulfil a dual function.

It is possible to impart to the subject device of the invention a torsional stiffness varying with the mutual angular shifts between the hub and the casing, by using chains 5 the linear masses of which increase from their inner axial ends 8 towards their outer ends 9. This can be achieved, for instance, by causing the number or thickness of the links constituting the chains to vary.

FIGURE 3 illustrates a constructional form of the invention in which a driving hub 2c, the rotation relatively to the driven casing 6c of which is limited, by any convenient means such as abutments (not shown), to a value very much less than the relative rotation of the counterpart members of the flywheel described in the above-cited patent, has a shape, when viewed in a plane perpendicular to its axis, such that the vector radius R to the point of tangency of the flexible element 5c on said hub increases with increasing deviation from the steady-state position. Provision is made in this instance for counterweights 11, or for an appropriate mutual outphasing of a plurality of individual devices. Manifestly, it would also be possible to vary the inner radius of the casing 6c.

FIGURE 4 shows still another alternative possibility in which the distance D, from the axis, of the force F of the coupling between the driving hub 2d and one end 8d of a chain 5d is made evolutive beyond a position of equilibrium, by making said chain long enough for it to form an angle, at its point of pivotal attachment, with the tangent T to the hub 2d, both this angle and the distance D obviously varying as the orientation of the hub relatively to the driven casing 6d varies in turn.

When the outer ends of the chains 5 are made fast with the casing 6 through friction alone, as is the case with the forms of embodiment of FIGURES 2 through 4, it is nonetheless possible to endeavor to increase this friction. In FIGURE 7, which is an end view, it may be seen that each link of a chain 5g has perfectly rounded protrusions 12 formed thereon for cooperating with cylindrical grooves of likewise rounded contour on the inner periphery of the driven casing 6g. In FIGURE 8, the driven casing 6h has a plurality of annular grooves with inclined sides 13, against which suitably shaped protrusions 14 on the links of a chain 5h may secure purchase. In the case of FIGURE 7, the friction moment is characterised by pulsations about its mean value, so that beyond an initial condition in which the hub and the casing (and hence the driving and driven shafts) have the same angular velocity, slip between the chain and the casing can occur only provided that the driving torque transmitted by the chain to the casing exceeds a value equal to the sum of the mean friction moment plus the pulsation value thereof. In the case of FIGURE 8, the friction moment is equal to the product of the mean contact radius times the centrifugal inertia force divided by the sine of the angle of inclination of the side 13 of a groove to a radial direction.

The torque transmitted by a chain by simple friction can also be augmented by imparting to the chain a coiling length of more than one turn, for instance by extending a relatively short chain 5i by means of two half-width chains 15 placed on either side of the chain 5i, as shown in developed form in FIGURE 9.

In the first place, the device as hereinbefore described may be used for smoothing out the irregular rotating motions of a shaft 1e with which the hub 2e is rigid (see FIGURE 5), since the casing 6e and the flexible elements 5e permit a timewise distribution, without loss, of the energy fluctuations associated to the rotation of said shaft, whereby the device is capable of damping torsional vibration.

Said devices likewise serve to couple together a driving shaft 1f and driven shaft 7, which are at least substantially coaxial and with which the hub and the casing are respectively rigid (see FIGURE 6). The shafts 1f and 7 rotate with a common mean angular velocity, but the driving shaft 1f may be possessed of irregular motion from which it is desirable to protect the driven shaft 7. It will readily be appreciated that any rotation of the hub 2f relatively to the casing 6f will result in a transfer of weighty elements constituting the chains 5f from the hub to the casing, or vice versa, and hence in a certain amount of work being done. Similar weighty flexible chains or elements consequently permit a timewise distribution of the fluctuations in the energy imparted to the device by the rotation of the driving shaft.

Such a device can serve accessorily and temporarily as a torque limiter provided that the flexible elements, for instance the chains 5b, 5c, 5d, 5g and 5h, are made fast with the corresponding casing by mere friction. It would furthermore be possible to provide the hub 2 and casing 6 with datum marks permitting ready measurement of their relative shifts (by stroboscopy in particular), and to deduce from this measurement the value of the torque transmitted.

In addition, a degree of misalignment between the shafts can be accommodated by possibly providing ball-joints or pseudo-ball-joints at the ends 8, 9 of the flexible elements 5, which elements may be associated to elastic members as specified hereinbefore.

It is, of course, to be understood that many changes and substitutions of parts may be made in the forms of embodiment described hereinabove, without departing from the spirit and scope of the invention.

What is claimed is:

1. In combination with a rotating shaft, a torsion damping device comprising an inner hub secured to said shaft, an outer cylindrical housing substantially coaxial with said shaft and surrounding said hub, a plurality of radial arms positioned at regular angular intervals and freely rotatable in unison with respect to said shaft, and a plurality of elongated, flexible and weighty elements having their respective inner ends firmly secured at regular angular intervals to said hub and their respective outer ends symmetrically interconnected by means of said radial arms, said elements having an outer portion frictionally engaging the inner surface of said cylindrical housing upon rotation of said device.

2. In combination with a rotating shaft, a torsion damping device comprising an inner hub secured to said shaft, an outer cylindrical housing substantially coaxial with said shaft and surrounding said hub, and at least one flexible weighty elongated element connecting said hub to said housing and having an inner end firmly secured to said hub and an outer portion frictionally engaging the inner surface of said cylindrical housing upon rotation of said device, said housing having formed in its inner surface grooves cooperating with said outer portion of said element for increasing the frictional engagement thereof.

3. In combination with a driving shaft and a driven shaft substantially coaxial therewith, a coupling device comprising an inner hub secured to said driving shaft, an outer cylindrical housing coaxially secured to said driven shaft and surrounding said hub, a plurality of radial arms positioned at regular angular intervals and freely rotatable in unison with respect to said hub, and a plurality of elongated, flexible and weighty elements having their respective inner ends firmly serured at regular angular intervals to said hub and their respective outer ends symmetrically interconnected by means of said radial arms, said elements having an outer portion frictionally engaging the inner surface of said cylindrical housing upon rotation of said device.

4. In combination with a driving shaft and a driven shaft substantially coaxial therewith, a coupling device comprising an inner hub secured to said driving shaft, an outer cylindrical housing coaxially secured to said driven shaft and surrounding said hub, and at least one flexible weighty elongated element connecting said hub to said housing and having an inner end firmly secured to said hub and an outer portion frictionally engaging the inner surface of said cylindrical housing upon rotation of said device, said housing having formed in its inner surface grooves cooperating with said outer portion of said element for increasing the frictional engagement thereof.

5. In combination with a driving shaft and a driven shaft substantially coaxial therewith, a coupling device comprising an inner hub secured to said driving shaft and having an external surface of evolutive radius with respect to said driving shaft, a counterweight associated to said hub for balancing the same upon rotation of said device, an outer cylindrical housing coaxially secured to said driven shaft and surrounding said hub and at least one flexible weighty elongated element connecting said hub to said housing and having an inner portion fast with the outer surface of said hub and an outer portion fast with the inner surface of said cylindrical housing.

6. In combination with a driving shaft and a driven shaft substantially coaxial therewith, a coupling device comprising an inner hub secured to said driving shaft, a outer cylindrical housing coaxially secured to said driven shaft and surrounding said hub, at least one flexible weighty elongated element connecting said hub to said housing and having an inner portion fast with the outer surface of said hub and an outer portion fast with the inner surface of said cylindrical housing, and ball means on at least one of said surfaces for engaging an end of said element.

7. In combination with a transmission shaft, a torsional vibrations suppressor comprising an inner hub secured to said shaft, an outer cylindrical casing extending substantially freely around said hub in radial spaced relation therewith, and at least one flexible, non-resilient, weighty, elongated element having one end positively secured to a point of the outer surface of said hub, another end positively secured to a point of the inner surface of said casing, and the intermediate portion extending between said surfaces along a generally spiral arc of but a minor fraction of one turn.

8. Device as claimed in claim 7, wherein the ends of said elongated element are hingedly connected to the respective points of said surface.

9. Device as claimed in claim 7, wherein said elongated element is a metal chain.

10. In combination with a driving shaft and a driven shaft substantially coaxial therewith, a substantially frictionless torque transmitting filter comprising an inner hub secured to one of said shafts, an outer cylindrical casing secured to the other of said shafts and surrounding said hub in radial spaced relation therewith, and at least one flexible, non-resilient, weighty, elongated element having one end positively secured to a point of the outer surface of said hub, another end positively secured to a point of the inner surface of said casing, and the intermediate portion extending between said surfaces along a generally spiral arc of but a minor fraction of one turn.

11. Device as claimed in claim 10, wherein the ends of said elongated element are hingedly connected to the respective points of said surfaces.

12. Device as claimed in claim 10, wherein said elongated element is a metal chain.

References Cited by the Examiner
UNITED STATES PATENTS 1,008,379 11/1911 Sneeringer _____ 64—15
3,199,361 8/1965 Prins _____ 74—124

FOREIGN PATENTS 1,079,278 4/1955 France.

FRED C. MATTERN, Jr., *Primary Examiner.*

W. S. RATLIFF, *Assistant Examiner.*